US010534519B2

(12) United States Patent
    Sung

(10) Patent No.: US 10,534,519 B2
(45) Date of Patent: Jan. 14, 2020

(54) DISPLAY DEVICE AND OPERATION METHOD THEREOF

(71) Applicant: SAMSUNG ELECTRONICS CO., LTD., Suwon-si, Gyeonggi-do (KR)

(72) Inventor: Eun-sook Sung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 345 days.

(21) Appl. No.: 15/400,215

(22) Filed: Jan. 6, 2017

(65) Prior Publication Data

US 2017/0199650 A1   Jul. 13, 2017

(30) Foreign Application Priority Data

Jan. 8, 2016   (KR) .................... 10-2016-0002753

(51) Int. Cl.
    *G06F 3/0484*   (2013.01)
    *H04L 29/06*    (2006.01)
    *H04N 21/41*    (2011.01)

(52) U.S. Cl.
    CPC ........ *G06F 3/04842* (2013.01); *G06F 3/0484* (2013.01); *H04L 63/08* (2013.01); *H04N 21/4131* (2013.01)

(58) Field of Classification Search
    CPC .............. G06F 3/04842; G06F 3/0484; H04N 21/4131; H04L 63/08
    See application file for complete search history.

(56) References Cited

U.S. PATENT DOCUMENTS

| 6,473,788 | B1 * | 10/2002 | Kim ................... G06F 11/0709 |
| | | | 358/1.15 |
| 7,299,304 | B2 * | 11/2007 | Saint-Hilaire .... H04L 29/12009 |
| | | | 710/10 |
| 7,308,492 | B2 * | 12/2007 | Konopka ................ H04L 29/06 |
| | | | 709/201 |
| 8,769,038 | B2 * | 7/2014 | Montoya ............. G06F 11/2294 |
| | | | 701/31.4 |
| 8,990,871 | B2 | 3/2015 | Son et al. |

(Continued)

FOREIGN PATENT DOCUMENTS

EP    2 876 886       5/2015
KR    10-2005-0112807  12/2005

(Continued)

OTHER PUBLICATIONS

Search Report and Written Opinion dated Mar. 28, 2017 in counterpart International Patent Application No. PCT/KR2017/000130.

(Continued)

*Primary Examiner* — Daeho D Song
(74) *Attorney, Agent, or Firm* — Nixon & Vanderhye P.C.

(57) ABSTRACT

A display device includes a display; a processor; a memory; a communicator comprising communication circuitry; and one or more programs stored in the memory and executed by the processor, wherein the one or more programs include instructions for displaying a user interface (UI) on the display, the UI being configured to request a remote support service from an external server providing the remote support service in order for an external device connected over a network to receive the remote support service through the communication circuitry.

11 Claims, 13 Drawing Sheets

(56) References Cited

U.S. PATENT DOCUMENTS

| | | | |
|---|---|---|---|
| 9,071,485 B2* | 6/2015 | Landers | H04L 12/2814 |
| 9,225,767 B2* | 12/2015 | Bomgaars | H04L 41/22 |
| 9,762,613 B2* | 9/2017 | Cherukuri | H04L 63/20 |
| 9,871,865 B2* | 1/2018 | Shaashua | H04W 4/70 |
| 2005/0038879 A1* | 2/2005 | Himmel | G06F 9/4401 |
| | | | 709/220 |
| 2006/0117209 A1* | 6/2006 | Drouet | G06F 21/568 |
| | | | 714/4.1 |
| 2006/0253545 A1* | 11/2006 | Lakamp | H04L 63/102 |
| | | | 709/217 |
| 2007/0192486 A1 | 8/2007 | Wilson et al. | |
| 2008/0120405 A1* | 5/2008 | Son | H04L 12/2809 |
| | | | 709/223 |
| 2008/0188207 A1* | 8/2008 | Lee | H04W 8/18 |
| | | | 455/414.1 |
| 2008/0209039 A1* | 8/2008 | Tracey | H04L 67/28 |
| | | | 709/225 |
| 2008/0214110 A1* | 9/2008 | Kim | H04L 67/30 |
| | | | 455/41.2 |
| 2009/0051507 A1 | 2/2009 | Outlaw et al. | |
| 2009/0125608 A1* | 5/2009 | Werth | G06Q 10/06 |
| | | | 709/218 |
| 2009/0165060 A1* | 6/2009 | Lawrence | H04N 5/4403 |
| | | | 725/81 |
| 2010/0174614 A1* | 7/2010 | Wu | G06Q 20/20 |
| | | | 705/21 |
| 2010/0257596 A1* | 10/2010 | Ngo | G06F 21/6218 |
| | | | 726/7 |
| 2011/0119346 A1* | 5/2011 | Kim | H04L 12/2814 |
| | | | 709/217 |
| 2011/0296460 A1* | 12/2011 | Jin | H04N 21/2393 |
| | | | 725/37 |
| 2012/0016535 A1* | 1/2012 | Lee | G06Q 10/20 |
| | | | 701/2 |
| 2012/0159343 A1* | 6/2012 | Park | H04L 12/2814 |
| | | | 715/740 |
| 2012/0195412 A1* | 8/2012 | Smith | H04M 3/537 |
| | | | 379/88.13 |
| 2012/0226739 A1* | 9/2012 | Kim | H04W 4/50 |
| | | | 709/203 |
| 2012/0233244 A1* | 9/2012 | Sugaya | H04L 41/0813 |
| | | | 709/203 |
| 2013/0018803 A1* | 1/2013 | Challu | G06Q 10/06 |
| | | | 705/304 |
| 2013/0024385 A1* | 1/2013 | Kang | G01D 4/002 |
| | | | 705/304 |
| 2013/0041951 A1 | 2/2013 | Lee et al. | |
| 2013/0072170 A1* | 3/2013 | Hong | H04L 67/16 |
| | | | 455/414.1 |
| 2013/0214935 A1* | 8/2013 | Kim | H04L 12/2816 |
| | | | 340/870.02 |
| 2014/0067094 A1 | 3/2014 | Park et al. | |
| 2014/0067131 A1* | 3/2014 | Park | A47L 15/4293 |
| | | | 700/275 |
| 2014/0075003 A1* | 3/2014 | Tanaka | H04L 41/50 |
| | | | 709/223 |
| 2014/0115487 A1* | 4/2014 | Sandler | H04M 1/7253 |
| | | | 715/740 |
| 2014/0122702 A1* | 5/2014 | Jung | H04L 43/0876 |
| | | | 709/224 |
| 2014/0122720 A1* | 5/2014 | Jung | H04L 41/5054 |
| | | | 709/225 |
| 2014/0156082 A1* | 6/2014 | Ha | D06F 33/02 |
| | | | 700/275 |
| 2014/0237120 A1* | 8/2014 | Hwang | G06F 9/5044 |
| | | | 709/226 |
| 2014/0344402 A1* | 11/2014 | Tivey | G05B 19/4185 |
| | | | 709/217 |
| 2015/0195673 A1* | 7/2015 | Rantapuska | H04W 4/06 |
| | | | 455/3.05 |
| 2015/0215309 A1* | 7/2015 | Aigner | H04L 63/0853 |
| | | | 726/4 |
| 2015/0234829 A1* | 8/2015 | Yoshitake | G06Q 10/10 |
| | | | 707/723 |
| 2015/0295769 A1* | 10/2015 | Anderson | H04L 65/1069 |
| | | | 370/254 |
| 2015/0296051 A1* | 10/2015 | Yip | G06F 8/61 |
| | | | 715/740 |
| 2015/0301765 A1* | 10/2015 | Nishiyama | G06F 3/1203 |
| | | | 358/1.15 |
| 2016/0063508 A1* | 3/2016 | Fukushima | G06Q 30/016 |
| | | | 705/304 |
| 2018/0268375 A1* | 9/2018 | Passila | G06Q 10/20 |

FOREIGN PATENT DOCUMENTS

| | | |
|---|---|---|
| KR | 10-2008-0001420 | 1/2008 |
| KR | 10-2011-0100749 | 9/2011 |
| KR | 10-2013-0046844 | 5/2013 |
| KR | 10-2014-0032263 | 3/2014 |
| WO | 01/50750 | 7/2001 |
| WO | 2008/083345 | 7/2008 |

OTHER PUBLICATIONS

Extended Search Report dated Jul. 31, 2018 in counterpart European Patent Application No. 17736107.8.

\* cited by examiner

DISPLAY DEVICE AND OPERATION METHOD THEREOF

CROSS-REFERENCE TO RELATED APPLICATION

This application is based on and claims priority under 35 U.S.C. § 119 to Korean Patent Application No. 10-2016-0002753, filed on Jan. 8, 2016, in the Korean Intellectual Property Office, the disclosure of which is incorporated by reference herein in its entirety.

BACKGROUND

1. Field

The present disclosure relates generally to a display device and an operation method thereof, and for example, to a display device that performs a remote support service request of a peripheral device instead of the peripheral device and an operation method of the display device.

2. Description of Related Art

Display devices have a function of displaying an image which a user may view. The user may view a broadcast program through a display device. Display devices display a broadcast program selected by a user from among broadcast signals transmitted from broadcast stations. Currently, broadcasting is switching from analog broadcasting to digital broadcasting worldwide.

Digital broadcasting indicates broadcasting by which digital images and digital voice signals are transmitted. Compared with analog broadcasting, digital broadcasting is more robust to external noise, thus exhibiting less data loss, easier error correction, higher resolutions, and clearer images. In addition, unlike analog broadcasting, digital broadcasting may provide a bidirectional service.

In addition, recently, smart televisions (TVs) for providing various items of content in addition to a digital broadcasting function have been provided. The smart TVs are capable of analyzing and providing what a user wants even without manipulation by the user, instead of passively operating according to selections by the user.

Research into a method of providing a more convenient environment to a user in an Internet of Things (IoT) environment in which things in life are connected over wired and wireless networks to share information has been conducted.

SUMMARY

A display device that performs a remote support service request of a peripheral device instead of the peripheral device and an method of the display device are provided.

Additional aspects will be set forth in part in the description which follows and, in part, will be apparent from the description.

According to an aspect of an example embodiment, a display device includes: a display; a processor; a memory; a communicator comprising communication circuitry; and one or more programs stored in the memory to be executed by the processor, wherein the one or more programs include instructions, which when executed by the processor, cause the display to: display a user interface (UI), on the display, the UI being configured to request a remote support service from an external server providing the remote support service in order for an external device connected over a network to receive the remote support service through the communication circuitry.

The one or more programs may further include instructions for displaying a UI, on the display, the UI being configured to receive an input (e.g., a user input) that approves providing of identification information of the external device to the external server.

The one or more programs may further include instructions for requesting the external server for information regarding whether to approve providing of identification information of the external device to the external server, receiving the information from the external server, and displaying the information on the display.

The one or more programs may further include instructions for an authentication procedure for allowing the external device to receive the remote support service from the external server.

The one or more programs may further include instructions for displaying an interface on the display, the interface being related to status information of the external device and permitting remote control of the external server in order for the external device to receive the remote support service from the external server.

The one or more programs may further include instructions for displaying a UI, on the display, the UI being related to selection of a reservation time for receiving the remote support service.

According to an aspect of another example embodiment, a method of operating a display device includes: connecting the display device with an external device over a network; and displaying a UI on a display, the UI being configured to request a remote support service from the external server providing the remote support service in order for the external device to receive the remote support service.

The displaying of the UI may include: displaying a UI on the display, the UI being configured to receive an input (e.g., a user input) that approves providing of identification information of the external device to the external server.

The displaying of the UI may further include requesting the external server for information regarding whether to approve providing of identification information of the external device to the external server, receiving the information from the external server, and displaying the information on the display.

The displaying of the UI may further include performing an authentication procedure for allowing the external device to receive the remote support service from the external server.

The operation may further include: displaying an interface on the display, the interface being related to status information of the external device and permitting remote control of the external server in order for the external device to receive the remote support service from the external server.

The displaying of the UI may further include displaying a UI on the display, the UI being related to selection of a reservation time for receiving the remote support service.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
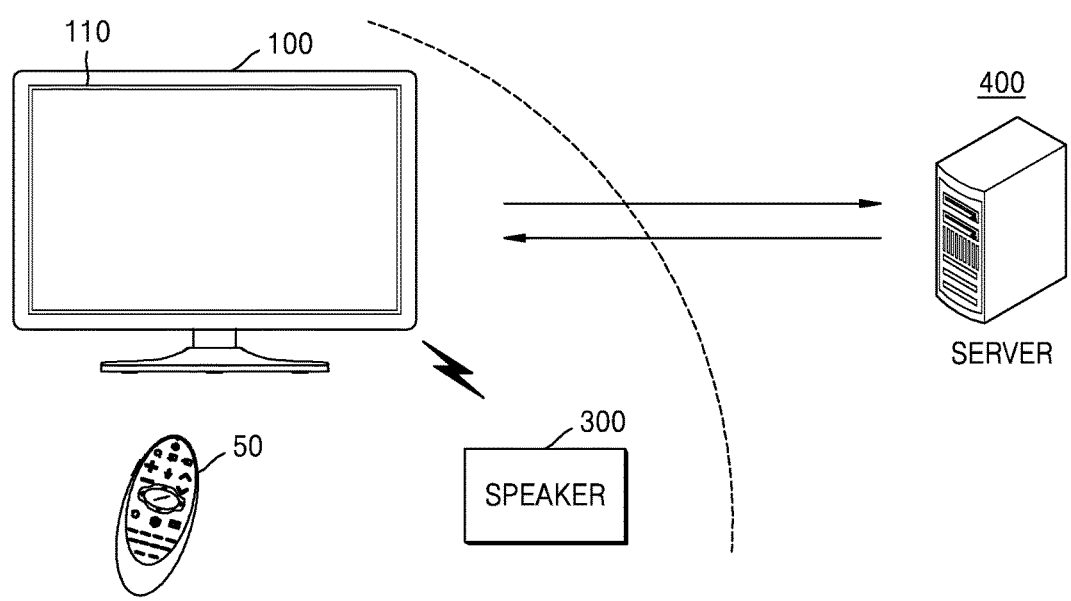
FIG. 1 is a diagram illustrating an example system including a display device, an external device, and a server, according to an example embodiment.

Reference will now be made to various embodiments, examples of which are illustrated in the accompanying drawings. In the drawings, parts irrelevant to the description may be omitted to clearly describe the example embodiments, and like reference numerals denote like elements throughout the disclosure. In this regard, the example embodiments may have different forms and should not be construed as being limited to the descriptions set forth herein. Accordingly, the example embodiments are merely described below, by referring to the figures, to explain various example aspects. As used herein, the term "and/or" includes any and all combinations of one or more of the associated listed items. Expressions such as "at least one of," when preceding a list of elements, modify the entire list of elements and do not modify the individual elements of the list.

The objectives, features, and advantages of the present disclosure will be clearer through the following detailed description. However, the present disclosure may be variously modified and have a plurality of embodiments, and hereinafter, specific embodiments are illustrated in the drawings and will be described in detail. In principle, like reference numerals denote like elements throughout the specification. In addition, in the following description, well-known functions or constructions are not described in detail so as not to obscure the disclosure with unnecessary detail. In addition, ordinal numbers (e.g., "first" and "second") used to describe the disclosure are merely identification symbols to differentiate an element from another element.

Hereinafter, electronic devices related to the present disclosure are described in more detail with reference to the accompanying drawings. Suffixes "module" and "interface" for components to be used in the description below are assigned or used together only by taking into account easy drafting of the disclosure and have no meanings or roles that are distinguished from each other.

Display devices described in the disclosure may include, for example, and without limitation, analog televisions (TVs), digital TVs, three-dimensional (3D) TVs, smart TVs, light-emitting diode (LED) TVs, organic light-emitting diode (OLED) TVs, plasma TVs, monitors, etc. It will be readily understood by those of ordinary skill in the art that the display devices described in the disclosure may include desktop computers, cellular phones, smartphones, tablet personal computers (PCs), laptop computers, digital broadcasting terminals, person digital assistants (PDAs), portable multimedia players (PMPs), navigation machines, etc., but are not limited thereto.

Throughout the disclosure, when it is described that a certain part is "connected" to another part, it should be understood that the certain part may be "directly connected" to another part or "electrically connected" to another part via another element in between. In addition, when a component "includes" an element, unless there is another opposite description thereto, it should be understood that the component does not exclude another element but may further include another element.

Hereinafter, the present disclosure will now be described in greater detail with reference to the accompanying drawings.

FIG. 1 is a diagram illustrating an example system including a display device 100, an external device 300, and a server 400, according to an example embodiment.

Referring to FIG. 1, the system may include the display device 100, the external device (e.g. a speaker) 300, and the server 400 that may communicate over a network.

The network may be a communications network. The communications network may include at least one of a computer network, the Internet, Internet of things (IoT), and a telephone network, or the like, but is not limited thereto.

As illustrated in FIG. 1, the display device 100 may be a TV but this is merely an example. The display device 100 may be implemented as an electronic device including a display 110.

According to an example embodiment, the display device 100 may be implemented as an analog TV, a digital TV, a three-dimensional (3D) TV, a smart TV, an LED TV, an OLED TV, a plasma TV, a monitor, etc. For example, the display device 100 may be implemented as various electronic devices such as a cellular phone, a tablet PC, a digital camera, a camcorder, a laptop computer, a desktop computer, an E-book reader, a digital broadcasting terminal, a PDA, a PMP, a navigation system, an MP3 player, a wearable device, etc., but is not limited thereto The display device 100 may be a fixed type or a portable type and may be a digital broadcasting terminal capable of receiving digital broadcasts.

The display device 100 may be implemented as not only a flat display device but also a curved display device having a curvature screen or a flexible display device capable of adjusting a curvature. An output resolution of the display device 100 may include, for example, a high definition (HD) resolution, a full HD resolution, an ultra HD resolution, or a resolution higher than ultra HD.

According to an example embodiment, the display device 100 may be controlled by a control device 50. The control device 50 may be implemented as a device of various forms for controlling the display device 100 such as a remote controller or a cellular phone, or the like, but is not limited thereto.

The control device 50 may control the display device 100 through short distance communication including, for example, and without limitation, infrared or Bluetooth. The control device 40 may control a function of the display device 100 using at least one of keys (including buttons) provided therein, a touch pad, a microphone (not shown) capable of receiving a voice of a user, and a sensor (not shown) capable of recognizing a motion of the control device 50.

The external device 300 according to an example embodiment may include a peripheral device within a range capable of being connected to the display device 100 over wired and wireless networks and sharing information. For example, the external device 300 may be a speaker, a refrigerator, a washing machine, an audio system, etc., but not limited thereto, that are connected at home over wired and wireless networks.

The server 400 according to an example embodiment may be a server providing a remote support service with respect to the external device 300. For example, the external server 400 may be a server of a manufacturing company of the speaker 300 and may provide a service for checking a malfunction of the speaker 300.

According to an example embodiment, the display device 100, on behalf of the external device 300, may request the remote support service that is to be provided by the external device 300 from the external server 400. In this regard, the display device 100 including the display 110 may provide a user interface necessary for the external device 300 that has no display itself, to receive the remote support service through the display 110.

According to an example embodiment, a user may use various electronic devices at home and it may be necessary for an electronic device, which has no display itself, to receive a status check service from a manufacturing company. In this regard, the user may conveniently make remote support service requests for various electronic devices by using the display device 100 including the display 110.

As another example, in the system of FIG. 1, the display device 100 may be electrically connected to a settop box (not shown). According to an example embodiment, the settop box or an IP settop box may be a terminal including a communicator (e.g., including communication circuitry) and a processor, connected over an external network, and providing a multimedia communication service. The display device 100 according to an example embodiment may display a result of a function performed by the settop box (not shown) on the display 110.

Figure 2:
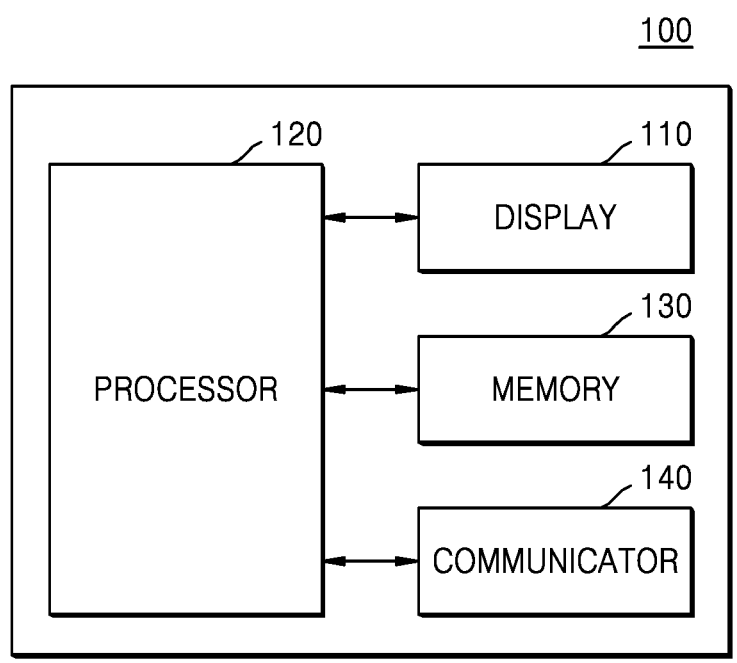
FIGS. 2 and 3 are block diagrams illustrating example display devices related to an example embodiment.
Figure 3:
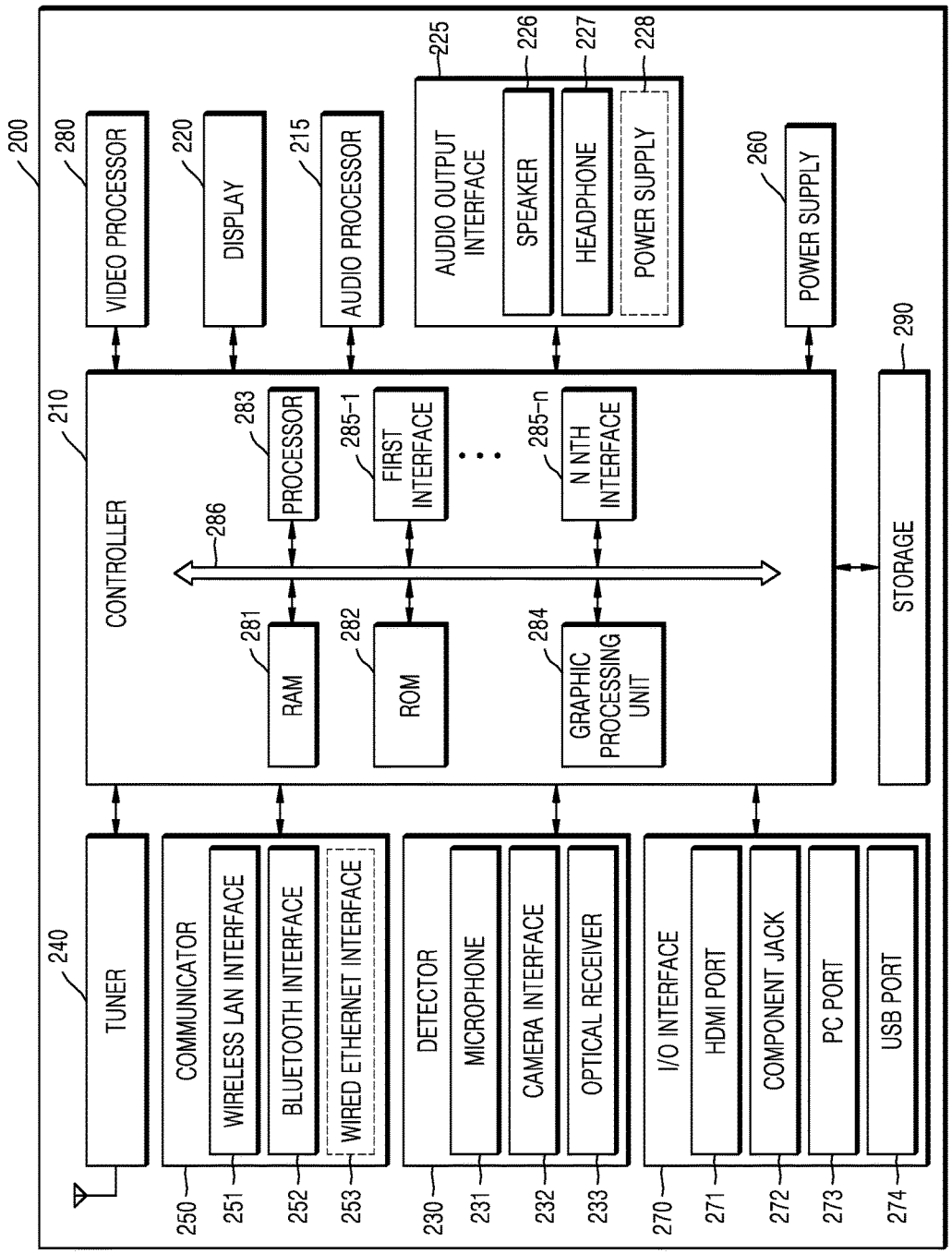

FIGS. 2 and 3 are block diagrams illustrating the example display device 100 and a display device 200, respectively, related to an example embodiment.

The display device 100 of FIG. 2 may be an embodiment of the display device 100 of FIG. 1. Referring to FIG. 2, the display device 100 may include the display 110, a processor 120, a memory 130, and a communicator (e.g., including communication circuitry) 140. However, the illustrated components are not all indispensable components. The display device 100 may be implemented by more or less components than those shown.

The display device 200 of FIG. 3 may be an embodiment of the display device 100 of FIG. 2. Referring to FIG. 3, the display device 200 according to an example embodiment may further include a controller (e.g., including processing circuitry) 210, a display 220, a detector (e.g., including detecting circuitry) 230, a video processor 280, an audio processor 215, an audio output interface (e.g., including interface circuitry) 225, a power supply 260, a tuner 240, a communicator (e.g., including communication circuitry) 250, an input/output (I/O) interface 270, and a storage unit 290.

The configuration of the display device 100 of FIG. 2 may be applied to the configuration of the display device 200 of FIG. 3 in the same way. For example, the display 110 of FIG. 2 may correspond to the display 220 of FIG. 3, the processor 120 of FIG. 2 may correspond to a processor 283 of FIG. 3, the memory 130 of FIG. 2 may correspond to the storage 290, a random access memory (RAM) 281, and a read-only memory (ROM) 281 of FIG. 3, and the communicator 140 of FIG. 2 may correspond to the communicator 250 of FIG. 3, and thus, the same descriptions will not be repeated below.

The components will now be sequentially described below.

The display 110 may convert an image signal, a data signal, an on-screen display (OSD) signal, a control signal, etc. that are processed by the processor 120 to generate a driving signal. The display 110 may be implemented as a PDP, an LCD, an OLED, a flexible display, etc. and may be implemented as a 3D display. The display 110 may be configured as a touch screen to be used as an input device as well as an output device.

The display 110 may display a video included in a broadcasting signal received through the tuner 240 on a screen under control of the processor 120. The display 110 may display content (for example, a motion picture) input through the communicator 140 or the I/O interface 270. The display 110 may output an image stored in the storage unit 290 under control of the processor 120. The display 110 may display a voice user interface (UI) (for example, including a voice command guide) for performing a voice recognition task corresponding to voice recognition or a motion UI (for example, including a user motion guide for motion recognition) for performing a motion recognition task corresponding to the motion recognition.

The display 110 according to an example embodiment may display a UI for requesting a remote support service from the external server 400 providing the remote support service in order for the external device 300 connected over a network through the communicator 140 to receive the remote support service, under control of the processor 120.

The display 110 according to an example embodiment may display a UI for receiving a user input that approves providing of identification information of the external device 300 to the external server 400, under control of the processor 120.

The display 110 according to an example embodiment may request the external server 400 for content according to whether to approve providing of the identification information of the external device 300 to the external server 400 and receive and display the content from the external server 400, under control of the processor 120.

The display 110 according to an example embodiment may display an interface relating to an authentication procedure in order for the external device 300 to receive the remote support service from the external server 400, under control of the processor 120.

The display 110 according to an example embodiment may display an interface relating to status information of the external device 300 in order for the external device 300 to receive the remote support service from the external server 400, under control of the processor 120.

The display 110 according to an example embodiment may display a UI relating to selection of a reservation time for receiving the remote support service, under control of the processor 120.

The processor 120 according to an example embodiment may include various processing circuitry, and may load software stored in a non-volatile memory on a volatile memory to drive the software. The processor 120 may access data related to the software (for example, an operating system (OS), an application program, etc.) loaded on the volatile memory. The volatile memory may be a device that deletes stored data if a power supply stops and may include a static RAM (SRAM), a dynamic RAM (DRAM), etc.

The processor 120 according to an example embodiment may control a signal flow between a general operation of the display device 100 and internal components of the display device 100 and process data. The processor 120 may control driving software (for example, the OS and the application program) stored in the display device 100 and may correspond to a central processing unit (CPU). For example, the processor 120 may load and drive the software stored in the non-volatile memory on the volatile memory and control the display device 100 by using a user command received through the detector 230 or the driven software.

The processor 120 may include a graphics processing unit (GPU) (not shown) for processing graphics corresponding to video. The processor 120 may be implemented by various processing circuitry, such as, for example, and without limitation, a dedicated processor, a CPU, or the like, and may be implemented as a system on chip (SoC) in which a core (not shown) and a GPU (not shown) are integrated. The processor 120 may include a single core, dual cores, triple cores, quad cores, or a multiple number of cores.

The processor 120 may include a plurality of processors. For example, the processor 120 may be implemented by a main processor (not shown) and a sub-processor (not shown) which operates in a sleep mode.

The processor 120 may execute one or more programs stored in the memory 130. Each program may include one or more instructions.

The processor 120 according to an example embodiment may request the remote support service from the external server 400 providing the remote support service in order for the external device 300 connected over a network through the communicator 140 to receive the remote support service.

The processor 120 according to an example embodiment may request the external server 400 for content according to whether to approve providing of the identification information of the external device 300 to the external server 400 through the communicator 140.

The processor 120 according to an example embodiment may receive the content from the external server 400 through the communicator 140 to control the display 110 to display the content.

The processor 120 according to an example embodiment may perform an authentication procedure for allowing the external device 300 to receive the remote support service from the external server 400.

The processor 120 according to an example embodiment may display an interface relating to status information of the external device 300 on the display 110 and allow remote control of the external server 400 in order for the external device 300 to receive the remote control support service from the external server 400.

The memory 130 according to an example embodiment may store various pieces of data, programs, and or applications for driving and controlling the display device 100. The programs stored in the memory 130 may include one or more instructions. The programs (one or more instructions) or the applications stored in the memory 130 may be executed by the processor 120.

The memory 130 according to an example embodiment may include a non-volatile memory and a volatile memory. The non-volatile memory may store various data and software (for example, an OS, an application program, etc.) for driving and controlling the display device 100. The non-volatile memory may be a device that does delete stored data if a power supply stops and may include a flash memory such as a NAND flash, an NOR flash, etc. but the present disclosure is not limited thereto.

The communicator 140 may include various communication circuitry configured to connect the display device 100 to an external device (e.g., an audio device) under control of the processor 120. The communicator 140 may include various communication circuitry, such as, for example, and without limitation, one or more of a wireless local area network (WLAN) interface 251, a Bluetooth interface 252, and a wired Ethernet interface 253 in correspondence with the performance and structure of the display device 100. The communicator 140 may include a combination of the WLAN interface 251, the Bluetooth interface 252, and the wired Ethernet interface 253. The communicator 140 may receive a control signal of the control device 50 under control of the processor 120. The control signal may be implemented as a Bluetooth type, a radio frequency (RF) signal type, or a Wi-Fi type.

For example, the communicator 140 may receive a signal corresponding to a user input (e.g., a touch, a push, a touch gesture, a voice, or a motion) from the control device 50 through communication of the Bluetooth interface 252.

The communicator 140 may further include communication circuitry, such as, for example, and without limitation, a near distance communication interface (for example, a near field communication (NFC) interface (not shown)), a Bluetooth low energy (BLE) interface (not shown) in addition to the Bluetooth interface 252.

The communicator 140 according to an example embodiment may perform wired/wireless communication with the external device 300 under control of the processor 120.

The communicator 140 according to an example embodiment may communicate with the external server 400 under control of the processor 120.

The audio processor 215 may process audio data. The audio processor 215 may perform various types of processing, such as decoding, amplification, and noise filtering, on the audio data. The audio processor 215 may include a plurality of audio processing modules for processing audio corresponding to a plurality of pieces of content.

The audio output interface 225 may include various audio output circuitry configured to output audio included in a broadcast signal received through the tuner 240, under control of the controller 210. The audio output interface 225 may output audio (e.g., a voice or sound) input through the communicator 250 or the I/O interface 270. The audio output interface 225 may output audio stored in the storage unit 290, under control of the controller 210. The audio output interface 225 may include various audio output circuitry, such as, for example, and without limitation, at least one of a speaker 226, a headphone output terminal 227, and a Sony/Philips digital interface (S/PDIF) output terminal 228. The audio output interface 225 may include a combination of the speaker 226, the headphone output terminal 227, and the S/PDIF output terminal 228.

The controller 210 may include various processing circuitry configured to control a general operation of the display device 200 and a signal flow between internal components of the display device 200 and process data. If an input of the user exists, or a previously set and stored condition is satisfied, the controller 210 may execute an OS and various applications stored in the storage unit 290.

The controller 210 may include a RAM 281 used to store a signal or data input from the outside of the display device 200 or used as a storage region corresponding to various operations performed by the display device 200, a ROM 282 in which a control program for controlling the display device 200 is stored, and a processor 283.

The detector 230 may include various detection circuitry configured to detect a voice of the user, an image of the user, or an interaction of the user. The detector 230 may include various detection circuitry, such as, for example, and without limitation, a microphone 231, a camera interface 232, and an optical receiver 233 but is not limited thereto.

The detector 230 according to an example embodiment may receive a user input and transfer the user input signal to the processor 120. The detector 230 may receive a user input such as an input for turning on or off the display device 200, a channel selection input, a channel up/down input, a screen setting input, etc. from the control device 50 of FIG. 1. The detector 230 according to an example embodiment may detect a power on/off button input included in the display device 200.

The detector 230 according to an example embodiment may detect whether power is supplied to the display device 200 from an external power source. For example, the detector 230 may detect whether a power plug of the display device 200 is connected to or is disconnected from the external power source. The detector 230 may detect whether a power supply stops and resumes from the external power source. For example, when a power failure occurs, the power supply may stop from the external power source.

The microphone 231 may receive a voice uttered by the user. The microphone 231 may convert the received voice into an electrical signal and output the converted electrical signal to the controller 210. The voice of the user may include, for example, a voice corresponding to a menu or function of the display device 200. The microphone 231 may be implemented by being integrated with or separated from the display device 200. The separated microphone 231 may be electrically connected to the display device 200 through the communicator 250 or the I/O interface 270. It will be easily understood by those of ordinary skill in the art that the microphone 231 may be excluded from the detector 230 according to the performance and structure of the display device 200. The microphone 231 according to an embodiment may convert a voice corresponding to a command to turn on or off power of the display device 200 into an electrical signal and output the converted electrical signal to the controller 210.

The camera interface 232 may receive an image (for example, continuous frames) corresponding to a motion of the user including a gesture within a camera recognition range. The motion of the user may include a part of a body of the user such as a face of the user, an expression, a hand, a fist, and a finger or a motion of the part of the body of the user, etc. The camera interface 232 may convert the received image into an electrical signal and output the converted electrical signal to the controller 210 under control of the controller 210. The camera interface 232 according to an embodiment may convert a motion (a gesture) corresponding to a command to turn on or off power of the display device 200 into an electrical signal and output the converted electrical signal to the controller 210.

The controller 210 may select a menu displayed on the display device 200 or may control in correspondence with a recognition result of the received motion by using the recognition result. For example, the controller 210 may control a channel, control a volume, move an indicator, and move a cursor.

The camera interface 232 may be implemented by being integrated with or separated from the display device 200. A separate device (not shown) including the separated camera interface 232 may be electrically connected to the display device 200 through the communicator 250 or the I/O interface 270. It will be easily understood by those of ordinary skill in the art that the camera interface 232 may be excluded from the detector 230 according to the performance and structure of the display device 200.

The optical receiver 233 may receive an optical signal (including a control signal) received from the control device 50 through an optical window (not shown) or the like of a bezel of the display 220. The optical receiver 233 may receive an optical signal corresponding to a user input (e.g., a touch, a push, a touch gesture, a voice, or a motion) from the control device 50. A control signal may be extracted from the received optical signal under control of the controller 210.

The tuner 240 may process a broadcast signal received in a wired or wireless manner by means of amplification, mixing, resonance, and the like and tune and select only a frequency of a channel which the display device 200 desires to receive from among a number of received frequency components. The broadcast signal may include audio, video and additional information (e.g., EPG).

The tuner 240 may receive a broadcast signal in a frequency band corresponding to a channel number (e.g., cable station number 506) according to a user input (e.g., a control signal received from the control device 50, examples of the control signal are a channel number input, a channel up-down input, and a channel input on an EPG screen image).

The tuner 240 may receive broadcast signals from various sources such as terrestrial broadcasting stations, cable broadcasting stations, satellite broadcasting stations, and Internet broadcasting stations. The tuner 240 may receive broadcast signals from sources such as analog broadcasting stations or digital broadcasting stations. A broadcast signal received through the tuner 240 may be decoded (e.g., audio decoding, video decoding, or additional information decoding) and separated into audio, video, and/or additional information. The separated audio, video, and/or additional information may be stored in the storage unit 290 under control of the controller 210.

The tuner 240 of the display device 200 may be single or plural in number. The tuner 240 may be implemented as all-in-one with the display device 200 or implemented as a separate device (e.g., a set-top box (not shown) having a tuner) electrically connected to the display device 200 or as a tuner (not shown) connected to the I/O interface 270.

The power supply 260 may receive a main power supply from an external power source. The power supply 260 may supply power input from an external power source to internal components of the display device 200, under control of the controller 210. The power supply 260 may supply power input from one or more batteries (not shown) located inside the display device 200 to the internal components, under control of the controller 220.

The I/O interface 270 may include various I/O circuitry configured to receive video (e.g., a moving picture), audio (e.g., a voice or music), and additional information (e.g., an EPG), and the like from the outside of the display device 200 under control of the controller 210. The I/O interface 270 may include various I/O circuitry, such as, for example, and without limitation, one or more of a high definition multimedia interface (HDMI) port 271, a component jack 272, a PC port 273, and a universal serial bus (USB) port 274. The I/O interface 270 may include a combination of the HDMI port 271, the component jack 272, the PC port 273, and the USB port 274.

It will be readily understood by those of ordinary skill in the art that a configuration and operation of the I/O interface 270 may be variously implemented according to various example embodiments.

The video processor 280 may process video data received by the display device 200. The video processor 280 may perform various types of image processing, such as decoding, scaling, noise filtering, frame rate conversion, and resolution conversion, on the video data.

A GPU 284 may generate a screen image including various objects, such as an icon, an image, and a text, by using a computation unit (not shown) and a renderer (not shown). The computation unit may compute attribute values such as a coordinate value, a shape, a size, and a color by which each object is to be displayed according to a layout of a screen image by using a user interaction detected through the detector 260. The renderer may generate various layouts of screen images including objects based on the attribute values computed by the computation unit. A screen image generated by the renderer may be displayed on a display area of the display 220.

First to nth interfaces 285-1 to 285-n may be connected to the various components described above. One of the first to nth interfaces 285-1 to 285-n may be a network interface connected to an external device via a network.

The RAM 281, the ROM 282, the processor 283, the GPU 284, and the first to nth interfaces 285-1 to 285-n may be connected to each other via an internal bus 286.

In the present example embodiment, the term "controller of a display device" may include the processor 283, the ROM 282, and the RAM 281.

The storage unit 290 may store various data, programs, or applications for operating and controlling the display device 200 under control of the controller 210. The storage unit 290 may store signals or data input/output in correspondence with operations of the video processor 280, the display 220, the audio processor 215, the audio output interface 225, the power supply 260, the tuner 240, the communicator 250, the detector 230, and the I/O interface 270. The storage unit 290 may store control programs for controlling the display device 200 and the controller 210, applications initially provided from a manufacturer or downloaded from the outside, GUIs related to the applications, objects (e.g., image text, icons, and buttons) for providing the GUIs, user information, documents, DBs, or related data.

According to an example embodiment, the term "storage unit" may include the storage unit 290, the ROM 282 of the controller 210, the RAM 281 of the controller 210, or a memory card (e.g., a micro SD card or a USB memory, not shown) mounted in the display device 200. In addition, the storage unit 290 may include a nonvolatile memory, a volatile memory, a hard disk drive (HDD), or a solid-state drive (SSD).

The storage unit 290 may include various program modules, such as, for example, and without limitation, a broadcast reception module, a channel control module, a volume control module, a communication control module, a voice recognition module, a motion recognition module, an optical reception module, a display control module, an audio control module, an external input control module, a power control module, a power control module for an external device connected in a wireless manner (e.g., Bluetooth), a voice DB, or a motion DB which is not shown. The not-shown modules and DBs of the storage unit 290 may be implemented by a software form to perform, by the display device 200, a broadcast reception control function, a channel control function, a volume control function, a communication control function, a voice recognition function, a motion recognition function, an optical reception control function, a display control function, an audio control function, an external input control function, a power control function, or a power control function for an external device connected in a wireless manner (e.g., Bluetooth), The controller 210 may perform each function by using the above-described software modules stored in the storage unit 290.

The display device 200 having the display 220 may be electrically connected to an external device (e. g., a set-top box including a tuner). For example, it will be easily understood by those of ordinary skill in the art that the display device 200 may be implemented by an analog TV, a digital TV, a 3D TV, a smart TV, an LED TV, an OLED TV, a plasma TV, a monitor, or the like but is not limited thereto.

The display device 200 may include a sensor (for example, an illuminance sensor, a temperature sensor, etc. (not shown) to detect inner and outer status of the display device 200.

The block diagrams of the display devices 100 and 200 of FIGS. 2 and 3 are blocks diagrams illustrating an example embodiment. Each component of the block diagrams may be united, added, or omitted according to the disclosure of the display devices 100 and 200 that are actually implemented. That is, if necessary, two or more components may be united into one component or one component may be subdivided into two or more components. A function performed in each block diagram is to describe the embodiments, and its detailed operation or device does not limit the scope of the present disclosure.

Figure 4:
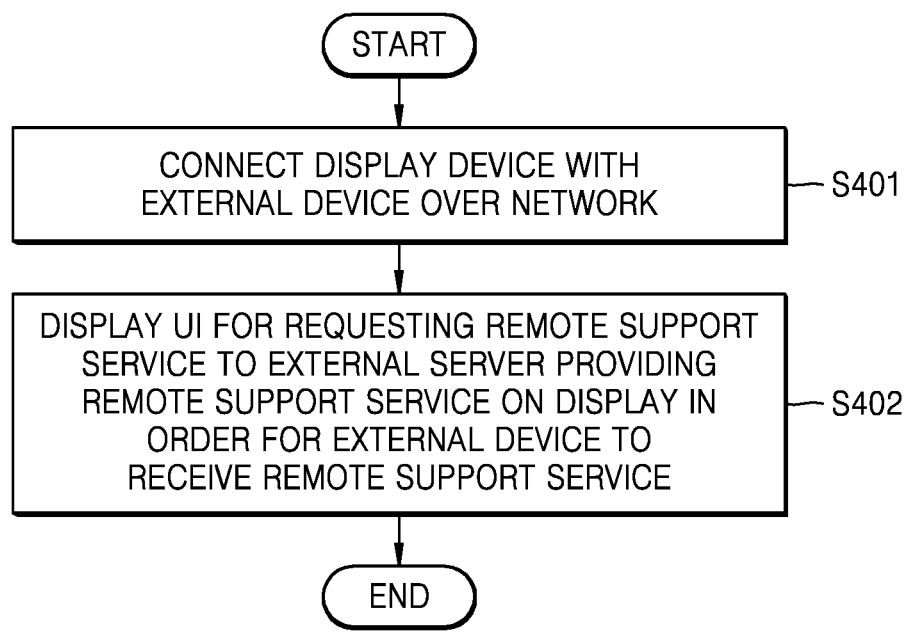
FIG. 4 is a flowchart illustrating an example method of operating the display device, according to an example embodiment.

FIG. 4 is a flowchart illustrating an example method of operating the display device 100, according to an example embodiment.

Referring to FIG. 4, in operation S401, the display device 100 according to an example embodiment may be connected to the external device 300 over a network through the communicator 140. For example, the display device 100 may be connected to electronic devices located within a predetermined distance (for example, inside the house) over wired/wireless communication.

In operation S402 of FIG. 4, the display device 100 according to an example embodiment may display a UI for requesting a remote support service to the external server 400 providing the remote support service on the display 110 in order for the external device 300 to receive the remote support service.

For example, when a service check of the external device 300 that does not have a display is necessary, the display device 100 may request the remote support service from the external server 400. The display device 100 may display an interface including items related to the remote support service on the display 110 so that a user may check the interface.

Figure 5:
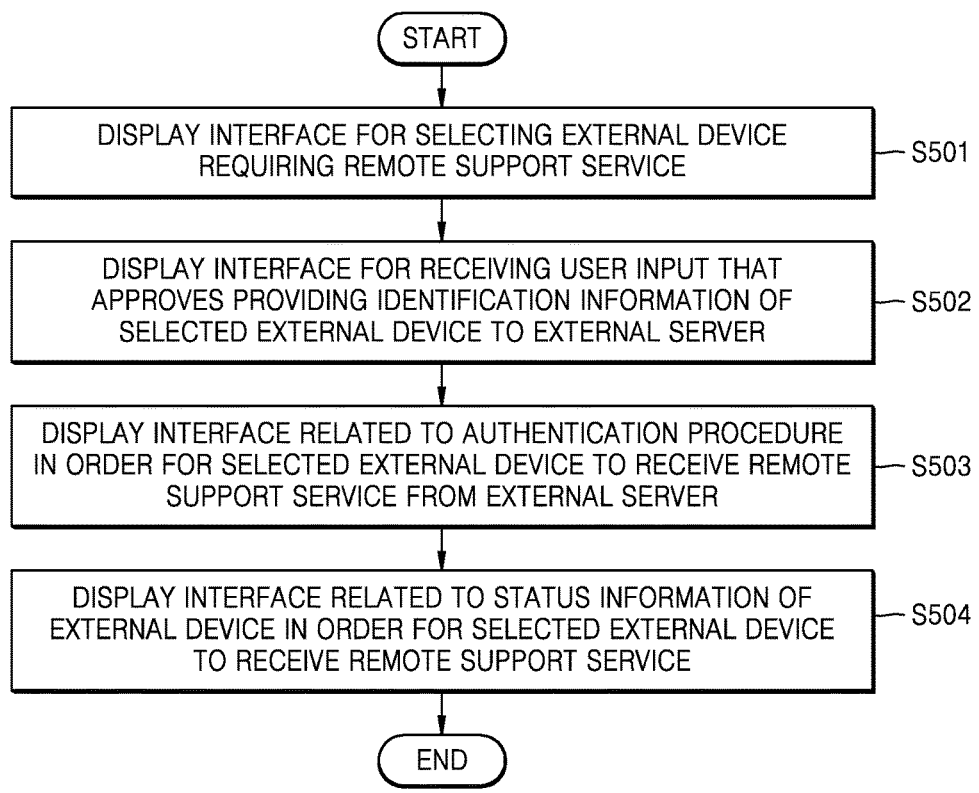
FIG. 5 is a flowchart illustrating an example method of operating the display device, according to an example embodiment.

FIG. 5 is a flowchart illustrating an example method of operating the display device 100, according to an example embodiment.

FIG. 5 is a flowchart illustrating examples in which the display device 100 displays a UI for requesting a remote support service from the external server 400.

In operation S501 of FIG. 5, the display device 100 according to an embodiment may display an interface for selecting the external device 300 requiring a remote support service on the display 110.

Figure 6:
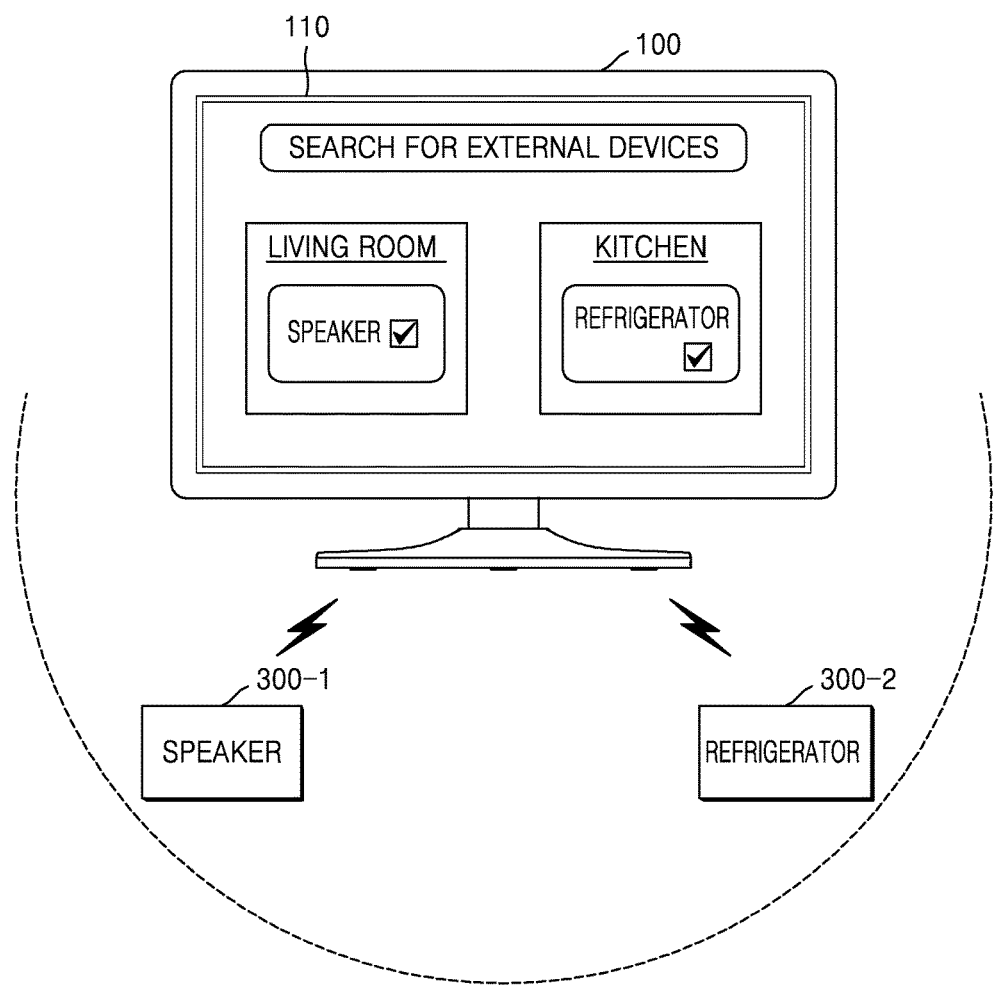
FIGS. 6, 7, 8, 9, 10 and 11 are diagrams illustrating an example method of operating the display device, according to an example embodiment.

For example, the display device 100 may preset peripheral devices capable of a network connection (see FIG. 6). The display device 100 may display a list of the preset peripheral devices on the display 110 (see FIG. 7). The display device 100 may receive a user input that selects a device requiring the remote support service from among the preset peripheral devices through the control device 50 (for example, a remote controller). The display device 100 may select the external device 300 that is to receive the remote support service based on the user input.

In operation S502, the display device 100 according to an example embodiment may display, on the display 110, an interface for receiving a user input that approves providing of identification information of the selected external device 300 to the external server 400.

For example, the display device 100 may display information of terms and conditions that permits that identification information (for example, a product name, a product number, a model year, basic settings, etc.) of the external device 300 is transmitted to the external server 400 and that is necessary in order for the external device 300 to receive a check service from the external server 400 on the display 110.

Thus, when the service check of the external device 300 that does not have a display is necessary, the information of terms and conditions may be provided through the display 110 of the display device 100 in order for a user to check the information of terms and conditions.

According to an example embodiment, the display device 100 may receive the information of terms and conditions from the external device 300 in order to display the information of terms and conditions. For example, the information of terms and conditions may be stored in a memory of the external device 300. For another example, the external device 300 may request the information of terms and conditions from the external server 400 and transmit the information of terms and conditions received from the external server 400 to the display device 100.

In operation S503 of FIG. 5, the display device 100 according to an example embodiment may display an interface related to an authentication procedure in order for the selected external device 300 to receive the remote support service from the external server 400 on the display 110.

The display device 100 according to an example embodiment may perform the authentication procedure in order for the selected external device 300 to receive the remote support service. For example, the display device 100 may request an authentication number from the external server 400. The external server 400 may encrypt the authentication number and transmit the encrypted authentication number to the display device 100. The display device 100 may perform the authentication procedure by displaying the received authentication number on the display 110, allowing the user to check the authentication number, and transmitting the authentication number to the external server 400. However, this is an embodiment and the present disclosure is not limited thereto.

In operation S504 of FIG. 5, the display device 100 according to an example embodiment may display an interface related to status information of the external device 300 in order the selected external device 300 to receive the remote support service on the display 110. For example, the display device 100 may display the status information (for example, a menu for changing setting information of a speaker, etc.) of the external device 300 on the display 110.

According to an example embodiment, the display device 100 may receive setting information from the external device 300 and display the received setting information on the display 110, and the external server 400 may perform a remote control through a network connection with the display 100, check a status of the speaker, and change the setting information, etc.

FIGS. 6 through 12 are diagrams illustrating an example method of operating the display device 100, according to an example embodiment.

FIG. 6 illustrates an example of an interface for the display device 100 to set and register peripheral devices 300-1 and 300-2 capable of a wired/wireless network connection.

According to an example embodiment, the display device 100 may search for the peripheral devices 300-1 and 300-2 capable of the wired/wireless network connection within a predetermined distance through the communicator 140.

As illustrated in FIG. 6, the display device 100 may display a list of the found peripheral devices 300-1 and 300-2 on the display 110. For example, the display device 100 may set and register a location and a title (for example, a speaker located in a living room and a refrigerator located in a kitchen) of a found external device.

FIG. 6 illustrates an example and is not limited thereto.

Figure 7:
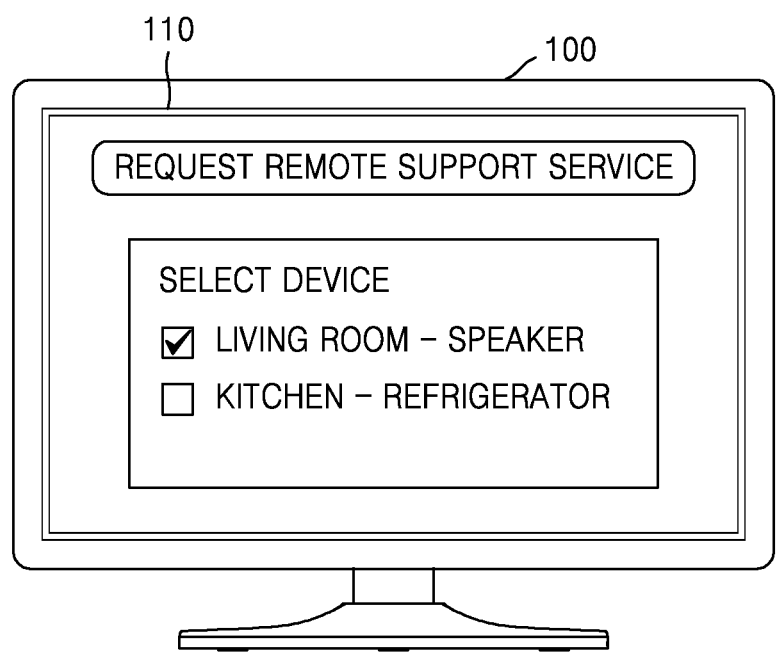

FIG. 7 illustrates an example of an interface for the display device 100 to select a device to receive a remote support service.

As illustrated in FIG. 7, the display device 100 may display a list of preset peripheral devices (for example, "living room-speaker" and "kitchen-refrigerator") on the display 110.

According to an example embodiment, the display device 100 may receive a user input that selects one ("living room-speaker") of a list of external devices (the list of preset peripheral devices) as an external device to receive the remote support service through the control device 50.

FIG. 7 illustrates an example and is not limited thereto.

Figure 8:
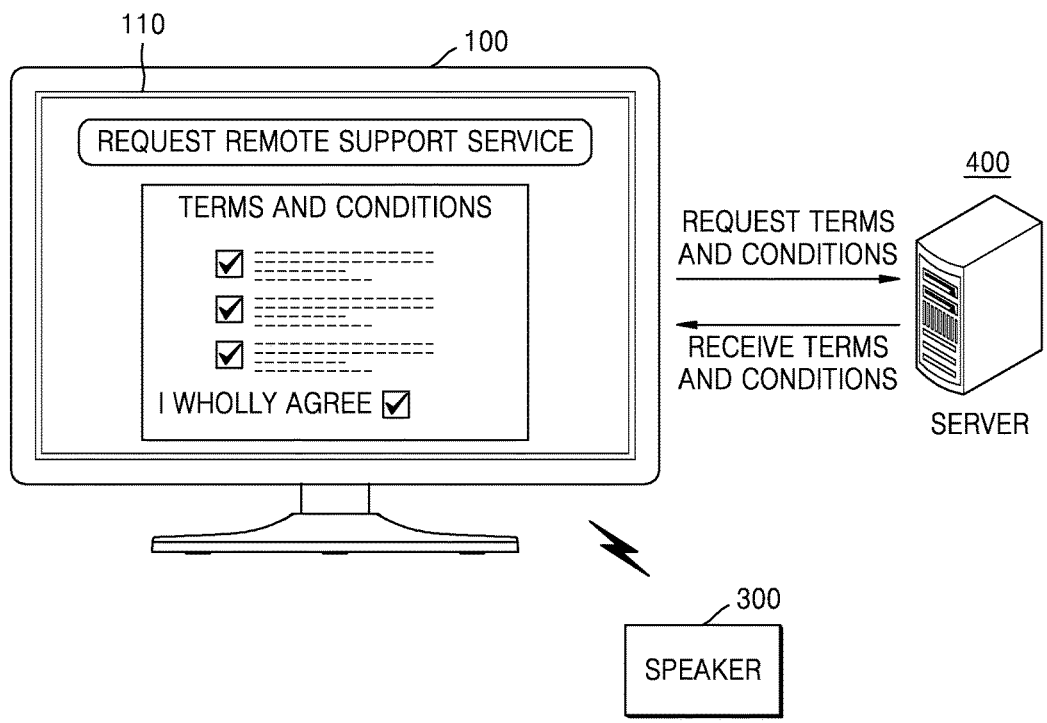

FIG. 8 illustrates an example in which the display device 100 requests the external server 400 for information of terms and conditions based on whether to approve providing of identification information of the external device 300 to the external server 400, receives the information of the terms and conditions, and provides the information of the terms and conditions to the display 110.

According to an example embodiment, the display device 100 may request the information of the terms and conditions from the external server 400 providing a remote support service through the communicator 140. The display device 100 may display, on the display 110, the information of the terms and conditions received from the external server 400 through the communicator 140.

According to an example embodiment, the display device 100 may receive a user input that approves providing of the information of the terms and conditions through the control device 50. The display device 100 may transmit user agreement information to the external server 400.

FIG. 8 illustrates an example and is not limited thereto.

Figure 9:
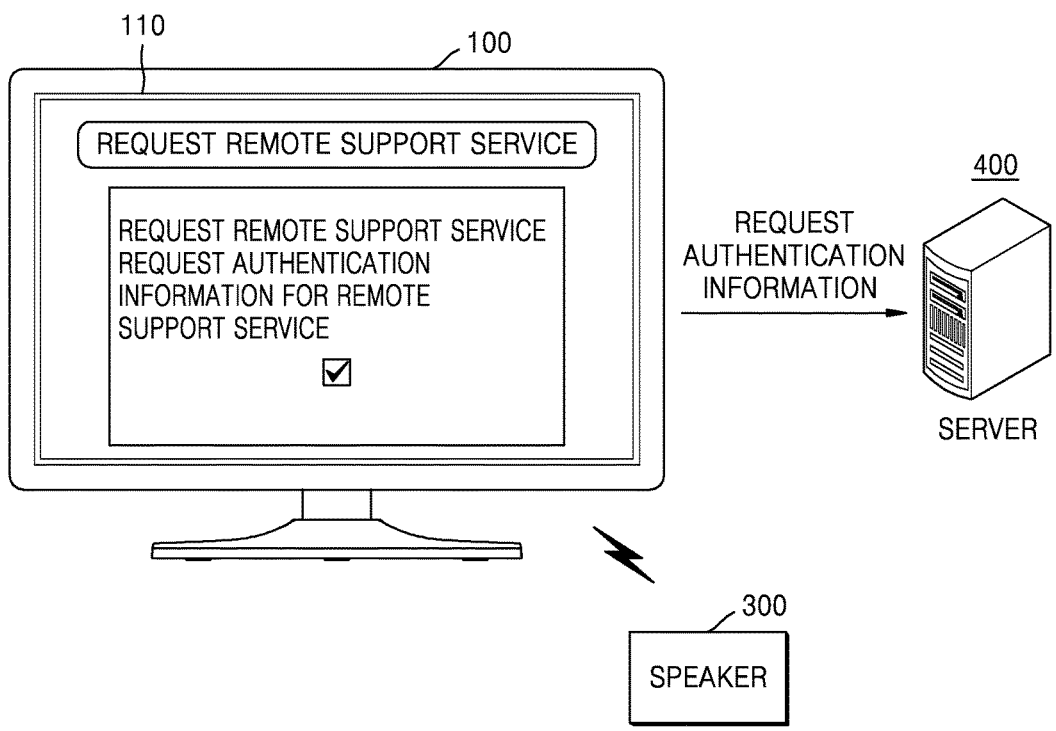
Figure 10:
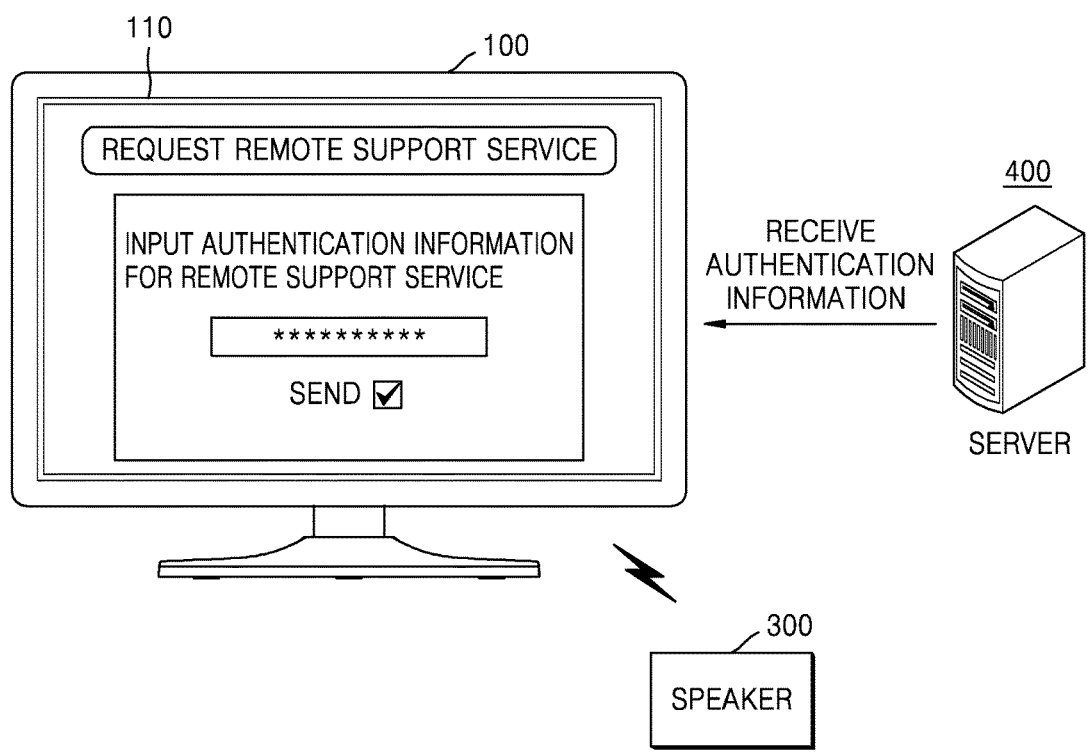

FIGS. 9 and 10 illustrate examples in which an interface regarding an authentication procedure for permitting a remote support service of the external server 400 with respect to the external device 300 is provided to the display 110 of the display device 100.

According to an example embodiment, the display device 100 may display an interface for requesting authentication information from the external server 400 on the display 110. The display device 100 may receive a user input for requesting the authentication information for the remote support service through the control device 50.

Referring to FIG. 10, the display device 100 may display authentication information received from the external server 400 on the display 110. The display device 100 may transmit the received authentication information to the external server 400. The external server 400 may perform an authentication procedure by comparing encrypted authentication information that has been transmitted to the display device 100 and the authentication information received from the display device 100.

FIGS. 9 and 10 illustrate examples and are not limited thereto.

Figure 11:
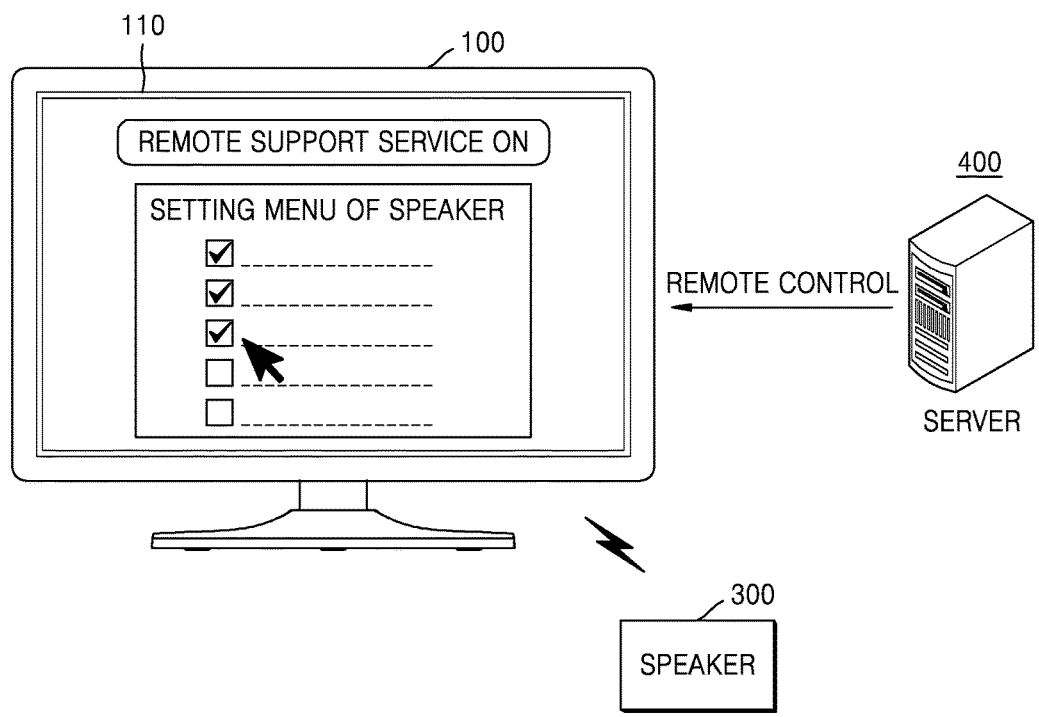

FIG. 11 illustrates an example of an interface remotely controlling the display 110 of the display device 100 in order for the external server 400 to determine a status of the external device 300.

According to an example embodiment, the display device 100 may receive setting information of the external device 300 from the external device 300 (a speaker) and may display an interface for changing the setting information on the display 110. The external server 400 may check and change a setting menu of the external device 300 by remotely controlling the display 110 of the display device 100.

FIG. 11 illustrates an example and is not limited thereto.

Figure 12:
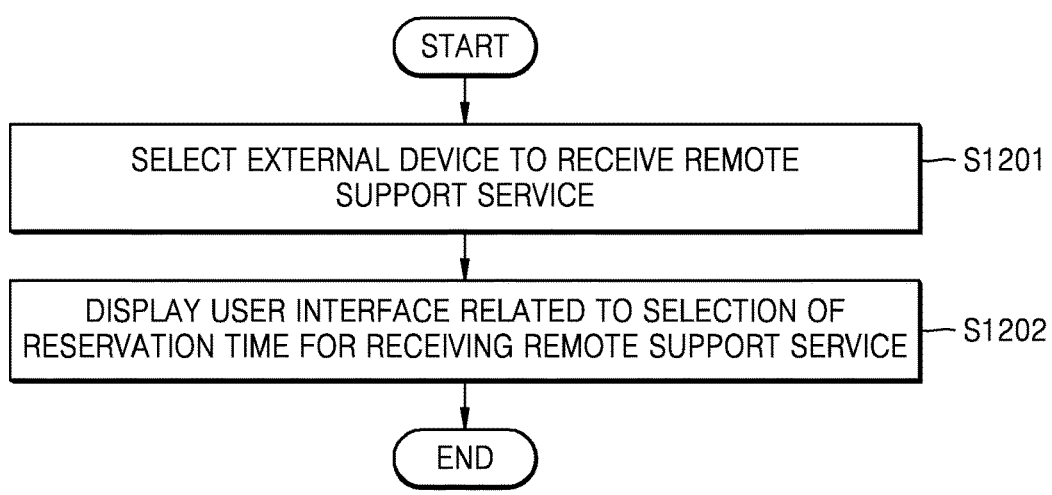
FIG. 12 is a flowchart illustrating an example method of operating the display device, according to an example embodiment.
Figure 13:
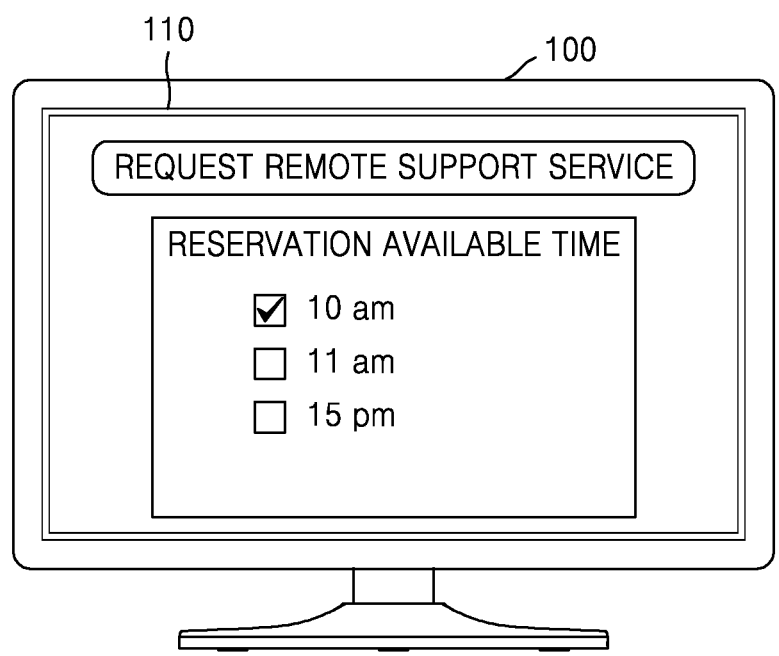
FIG. 13 is a diagram illustrating the example method of FIG. 12.

FIG. 12 is a flowchart illustrating an example method of operating the display device 100, according to an example embodiment. FIG. 13 is a diagram illustrating the example method of FIG. 12.

In operation S1201 of FIG. 12, the display device 100 according to an example embodiment may select an external device to receive a remote support service.

According to an example embodiment, the display device 100 may select an external device requiring the remote support service from among a plurality of preset peripheral devices. For example, the display device 100 may select an external device based on a user input that selects one from an external device list provided on the display 110 through the control device 50.

In operation S1202, the display device 100 according to an example embodiment may display a UI related to a selection of a reservation time for receiving the remote support service on the display 110.

According to an example embodiment, the display device 100 may select a service available time for receiving the remote support service and request the service available time from the external server 400.

Referring to FIG. 13, for example, the display device 100 may access a service related web page provided by the external server 400 and display a reservation available time list on the display 110. The display device 100 may receive a user input that selects a reservation available time (for example, 10 AM) through the control device 50. The display device 100 may request the remote support service from the external server 400 based on the user input.

FIG. 13 illustrates an example and is not limited thereto.

It will be understood that the example embodiments described above are considered in a descriptive sense only and not for purposes of limitation. In addition, it will be understood that the flowcharts of FIGS. 4, 5, and 12 are not limited to the sequences of operations illustrated therein, some operations may be omitted or added according to various example embodiments of the present disclosure, and a sequence of some operations may be modified.

One or more example embodiments may be implemented in a form of a recording medium including computer-executable instructions such as a program module executed by a computer system. A non-transitory computer-readable recording medium may be an arbitrary available medium which may be accessed by a computer system and includes all types of volatile and non-volatile media and separated and non-separated media. In addition, the non-transitory computer-readable recording medium may include all types of computer storage media and communication media. The computer storage media include all types of volatile and non-volatile and separated and non-separated media implemented by an arbitrary method or technique for storing information such as computer-readable instructions, a data structure, a program module, or other data. The communication media typically include computer-readable instructions, a data structure, a program module, other pieces of data of a modulated signal, other transmission mechanisms, and arbitrary information delivery media.

In addition, in the disclosure, "unit" may be a hardware component such as a processor or a circuit and/or a software component to be executed by a hardware component such as a processor.

The example embodiments described above are only illustrative, and it will be understood by those of ordinary skill in the art that various changes in form and details may be made therein without changing the technical spirit and scope of features of the present disclosure. Therefore, the example embodiments should be understood in the illustrative sense only and not for the purpose of limitation in all aspects. For example, each component described as a single type may be carried out by being distributed, and likewise, components described as a distributed type may also be carried out by being coupled.

It should be understood that example embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims.

What is claimed is:

1. A display device comprising:
    a display;
    a processor;
    a memory;
    a communicator comprising communication circuitry; and
    one or more programs stored in the memory configured to be executed by the processor, wherein the one or more programs comprise instructions which when executed by the processor,
        receive, in the display, a first user input to select at least one of a list of external devices to receive a remote support service, wherein the list of external devices are connected to the display device over a network to receive the remote support service through the communication circuitry from an external server;
        request, to the external server, information about terms and conditions for the remote support service for the selected external device;
        receive, from the external server, the information about terms and conditions regarding whether to approve providing of identification information of the external device to the external server;
        control the display to display a user interface (UI) comprising the received information about terms and conditions for the remote support service;
        receive a second user input that approves providing of the identification information of the external device via the user interface (UI); and
        in response to the second user input, transmit user agreement regarding the information about terms and conditions for the remote support service to the external server.

2. The display device of claim 1, wherein the one or more programs further comprise instructions for: requesting the external server for the information regarding whether to approve providing of identification information of the external device to the external server.

3. The display device of claim 1, wherein the one or more programs further comprise instructions for executing an authentication procedure configured to allowing the external device to receive the remote support service from the external server.

4. The display device of claim 1, wherein the one or more programs further comprise instructions for: displaying an interface on the display, the interface configured to provide status information of the external device and to permit remote control of the external server in order for the external device to receive the remote support service from the external server.

5. The display device of claim 1, wherein the one or more programs further comprise instructions for: displaying a UI on the display, the UI configured to provide selection of a reservation time for receiving the remote support service.

6. A method of operating a display device, the method comprising:
   receiving, in a display of the display device, a first user input to select at least one of a list of external devices to receive a remote support service, wherein the list of external devices are connected to the display device over a network to receive the remote support service through a communicator from an external server;
   requesting, to the external server, information about terms and conditions for the remote support service for the selected external device;
   receiving, from the external server, the information about terms and conditions regarding whether to approve providing of identification information of the external device to the external server;
   controlling the display of the display device to display a user interface (UI) comprising the received information about terms and conditions for the remote support service;
   receiving a second user input that approves providing of the identification information of the external device via the user interface (UI); and
   in response to the second user input, transmitting user agreement regarding the information about terms and conditions for the remote support service to the external server.

7. The method of claim 6, further comprising: requesting the external server for the information regarding whether to approve providing of identification information of the external device to the external server.

8. The method of claim 6, further comprising: performing an authentication procedure for allowing the external device to receive the remote support service from the external server.

9. The method of claim 6, further comprising: displaying an interface on the display, the interface being related to status information of the external device and permitting remote control of the external server in order for the external device to receive the remote support service from the external server.

10. The method of claim 6, further comprising: displaying a UI on the display, the UI being related to selection of a reservation time for receiving the remote support service.

11. A non-transitory computer-readable recording medium having recorded thereon a computer program which, when executed by a processor, causes the processor to perform the operations of the method of claim 6.

* * * * *